United States Patent
Wei et al.

(10) Patent No.: US 9,996,897 B2
(45) Date of Patent: Jun. 12, 2018

(54) IMAGE DISPLAY METHOD FOR A PORTABLE DISPLAY DEVICE

(71) Applicant: CHANG GUNG UNIVERSITY, Taoyuan (TW)

(72) Inventors: Jyh-Da Wei, Taoyuan (TW); Hsu-Fu Hsiao, Taoyuan (TW); Chen-Cheng Tsai, Taoyuan (TW); Yi-Xin Liu, Taoyuan (TW); Po-I Liu, Taoyuan (TW); Jiun-Shian Sung, Taoyuan (TW)

(73) Assignee: Chang Gung University, Taoyuan (TW)

( * ) Notice: Subject to any disclaimer, the term of this patent is extended or adjusted under 35 U.S.C. 154(b) by 35 days.

(21) Appl. No.: 15/187,122

(22) Filed: Jun. 20, 2016

(65) Prior Publication Data

US 2017/0140503 A1    May 18, 2017

(30) Foreign Application Priority Data

Nov. 18, 2015  (TW) .............................. 104138084 A (51) Int. Cl.
*G09G 5/00* (2006.01)
*G06T 3/20* (2006.01)
(Continued)

(52) U.S. Cl.
CPC .............. *G06T 3/20* (2013.01); *G06F 1/1613* (2013.01); *G06F 1/1694* (2013.01);
(Continued)

(58) Field of Classification Search
None
See application file for complete search history.

(56) References Cited

U.S. PATENT DOCUMENTS

| 6,307,963 | B1 * | 10/2001 | Nishida | ................ G06K 9/3241 382/170 |
| 2003/0026458 | A1 * | 2/2003 | Nahum | ................ G06K 9/6203 382/106 |

(Continued)

FOREIGN PATENT DOCUMENTS

| CN | 101969533 A | * | 2/2011 | ............. H04N 5/217 |
| CN | 103309582 A | * | 9/2013 | ........... G06F 3/0487 |
| CN | 104866080 A | * | 8/2015 | ............... G09G 3/20 |

OTHER PUBLICATIONS

("A Coefficient Energy Concentration Model for Motion Compensated Image Coding" Bowling et al. IEEE. International Conference on ICASSP. 1984.*

*Primary Examiner* — Zhengxi Liu
*Assistant Examiner* — Khoa Vu
(74) *Attorney, Agent, or Firm* — Brinks Gilson & Lione (57) ABSTRACT

An image display method for a portable display device to be implemented by a processing module includes: controlling the portable display device to display an image in a default position within a display area; estimating a displacement distance of the portable display device during an $(X+1)^{th}$ unit time period, based at least on a number (N) of displacement distances of the portable display device respectively during (N) number of immediately previous unit time periods or on accelerations of the portable display device respectively associated with $(X-1)^{th}$ and $(X)^{th}$ unit time periods; and controlling the portable display device to shift the image with respect to the display area based on the displacement distance estimated thereby.

8 Claims, 6 Drawing Sheets

(51) Int. Cl.
*G06F 1/16* (2006.01)
*G09G 3/20* (2006.01)
*G06F 3/0485* (2013.01)

(52) U.S. Cl.
CPC ............ *G06F 3/0485* (2013.01); *G09G 3/20* (2013.01); *G09G 2340/0464* (2013.01)

(56) References Cited

U.S. PATENT DOCUMENTS

| | | | | |
|---|---|---|---|---|
| 2007/0171197 | A1* | 7/2007 | Lai | G06F 1/1613 345/156 |
| 2013/0141601 | A1* | 6/2013 | Proca | H04N 5/23267 348/208.6 |
| 2014/0354541 | A1* | 12/2014 | Li | G06F 3/03 345/156 |
| 2015/0040050 | A1* | 2/2015 | Nakao | G06Q 10/107 715/769 |
| 2015/0228100 | A1* | 8/2015 | Xun | G09G 5/00 345/629 |
| 2016/0205323 | A1* | 7/2016 | Jiang | G06T 5/50 348/208.4 |

* cited by examiner

IMAGE DISPLAY METHOD FOR A PORTABLE DISPLAY DEVICE

CROSS-REFERENCE TO RELATED APPLICATION

This application claims priority of Taiwanese Patent Application No. 104138084, filed on Nov. 18, 2015.

FIELD

The disclosure relates to an image display method, and more particularly to an image display method for a portable display device.

BACKGROUND

With the development and progress of science and technology, mobile devices, such as smart phones or tablet computers, have become indispensable parts of our lives. When such mobile device is held by a user with one hand and used while the user is walking or in a moving vehicle, the display screen of the mobile device may shake with movement of the user's hand. It is uncomfortable for the user's eyes to view image information displayed on the unsteady display screen. Especially, after continuous viewing of the unsteady display screen, the user's eyes may easily feel tired or fatigued, resulting in damages to the eyes, eye diseases or motion sickness.

In order to solve the above problem, a conventional technique involves shifting in position a display area on the display screen with respect to the display screen by an offset distance that is determined based on a current acceleration of the mobile device sensed by an acceleration sensor. However, the offset distance determined in such way may often be erroneous.

SUMMARY

Therefore, an object of the disclosure is to provide an image display method that can overcome the drawbacks of the prior art.

According to the disclosure, the image display method for a portable display device is implemented by a processing module. The portable display device includes a detection module. The image display method includes the steps of:

(A) controlling the portable display device to display an image in a default position within a display area of the portable display device, there being a predetermined minimum distance between boundaries of the image and the display area when the image is in the default position;

(B) estimating a displacement distance of the portable display device in a first direction during an $(X+1)^{th}$ unit time period, based at least on a number (N) of displacement distances of the portable display device in the first direction respectively during (N) number of immediately previous consecutive unit time periods obtained by the detection module or on accelerations of the portable display device respectively associated with $(X-1)^{th}$ and $(X)^{th}$ unit time periods obtained by the detection module, where (X) is a variable and (N) is a positive integer;

(C) calculating, based on the displacement distance estimated in step (B) and a predetermined offset parameter, an offset displacement distance associated with the image; and (D) controlling the portable display device to shift the image by the offset displacement distance with respect to the display area in a second direction opposite to the first direction.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
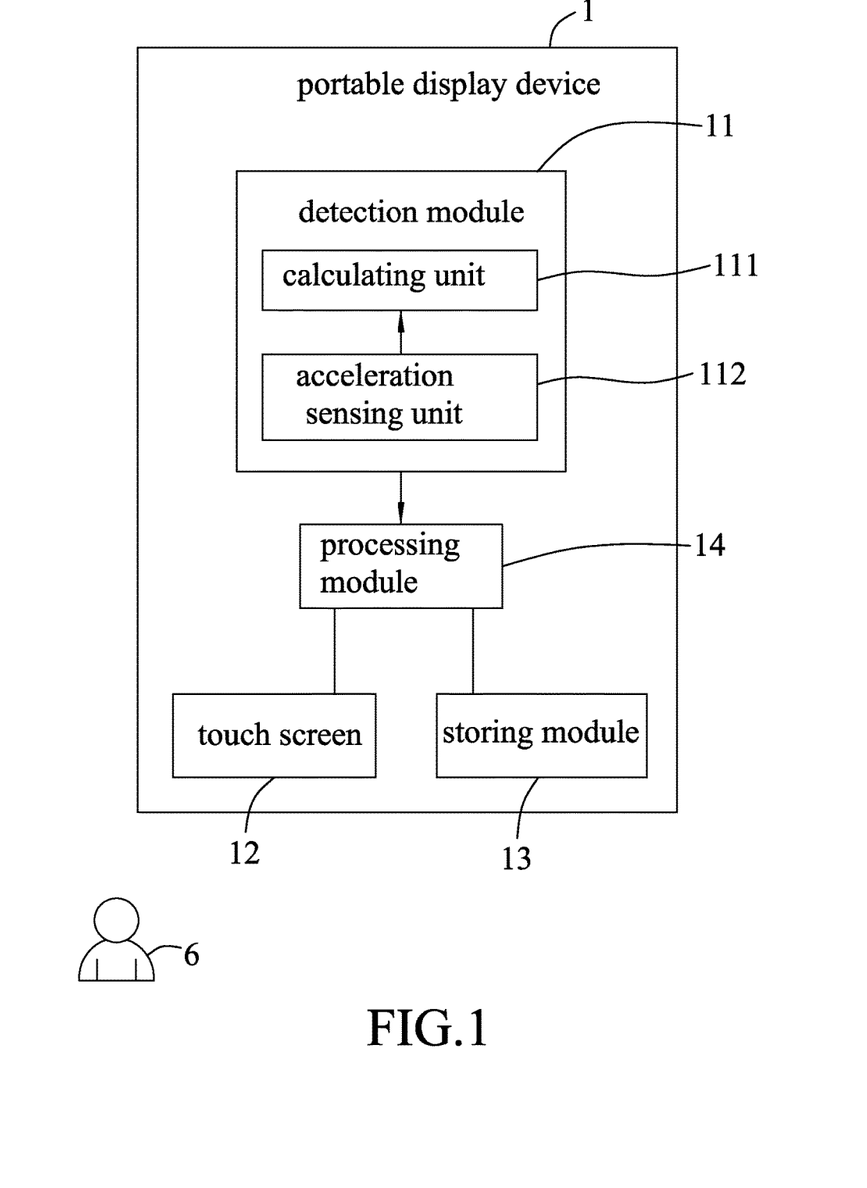
FIG. 1 is a schematic view illustrating a processing module that is built in a portable display device and that is configured for implementing the first embodiment of an image display method for a portable display device according to the disclosure.
Figure 6:
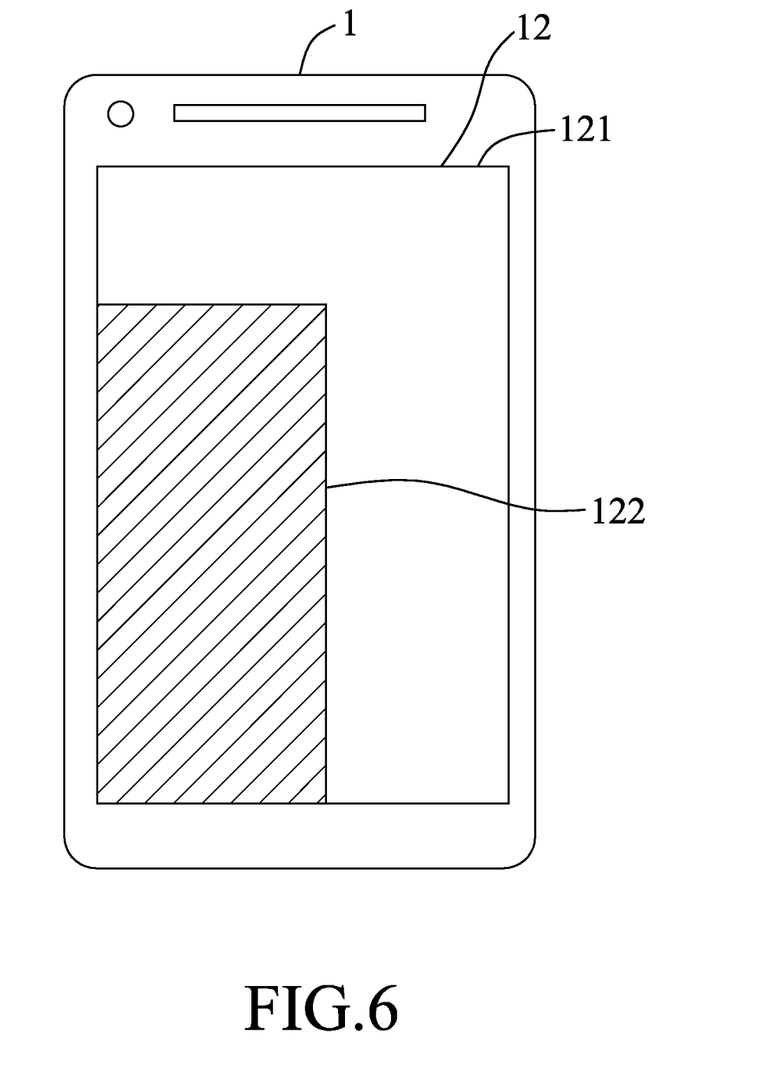
FIG. 6 is a schematic diagram illustrating a portion of the image being shifted out of the display area.

Referring to FIGS. 1 and 6, a processing module 14 is used to implement the first embodiment of an image display method for a portable display device 1 according to the disclosure. The portable display device 1 is carried by a user 6 and includes a detection module 11, a touch screen 12 with a display area 121, a storing module 13, and the processing module 14 coupled to the detection module 11, the touch screen 12 and the storing module 13.

The detection module 11 includes a calculating unit 111 and an acceleration sensing unit 112 coupled to the calculating unit 111. However, in other embodiments, the detection module 11 may include an image capturing unit, e.g., a front panel camera or eyewear/headwear image capturing devices (not shown), and an image processor (not shown) coupled to the image capturing unit.

The touch screen 12 is configured to output an input signal which is generated in response to a touch operation to the processing module 14, and is controlled by the processing module 14 to display an image 122 within the display area 121 of the portable display device 1.

The storing module 13 stores a predetermined threshold time interval, a predetermined threshold distance and a lookup table. The lookup table contains a plurality of different displacement distances corresponding respectively to a plurality of different sets of accelerations.

In this embodiment, the processing module 14 is built as a part of the portable display device 1. However, in other embodiments, the processing module 14 may be an entity separate from the portable display device 1 and communicating with the portable display device 1 over a network. Besides, the processing module 14 may be installed with a software application (not shown) that includes instructions executable by the processing module 14 to implement related steps of the image display method of the first embodiment of the disclosure. Alternatively, the processing module 14 may be an electronic chip for implementing related steps of the image display method of the first embodiment of the disclosure. The portable display device 1 may be, for example, a smart phone, a tablet computer, a notebook computer, wearable device or the like.

Figure 2:
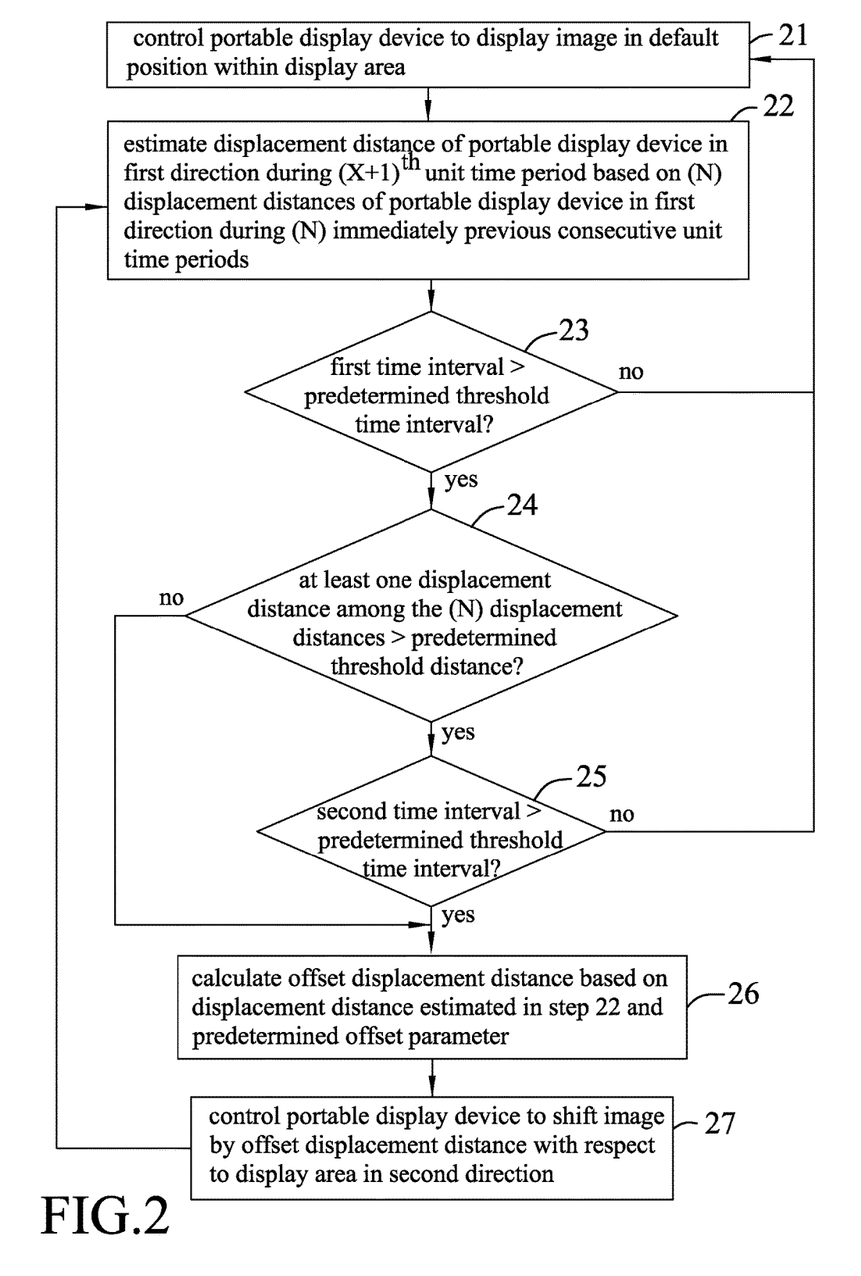
FIG. 2 is a flow chart illustrating the first embodiment of the disclosure.

FIG. 2 is a flow chart illustrating the image display method of the first embodiment of the disclosure.

Figure 5:
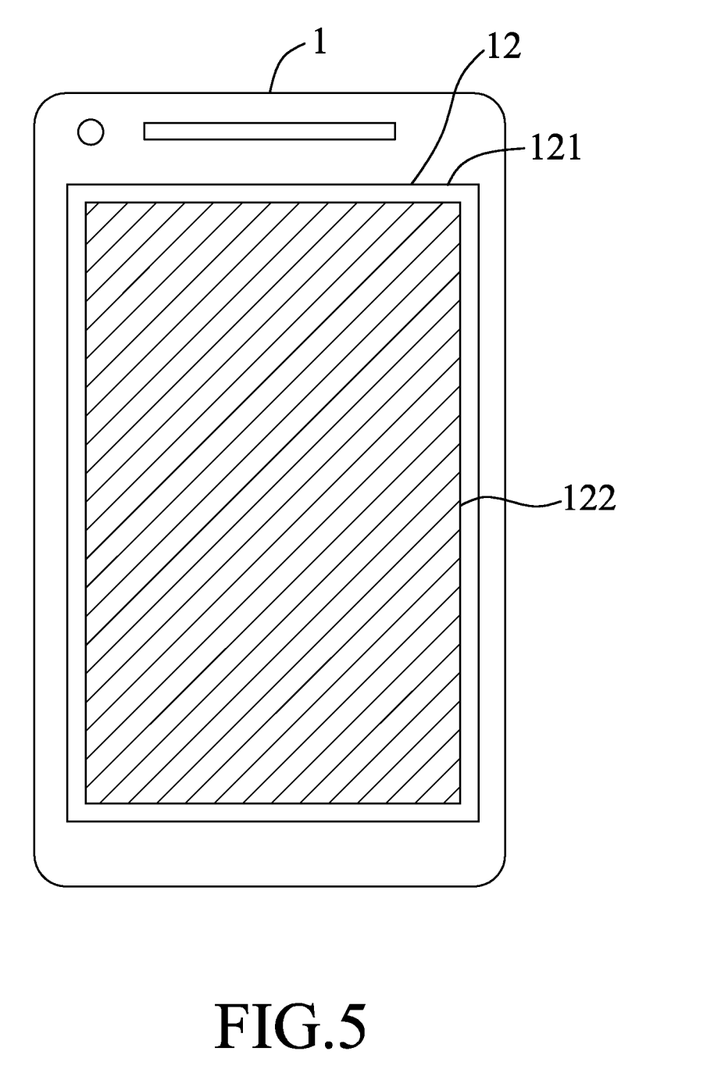
FIG. 5 is a schematic diagram illustrating an image in a default position within a display area of the portable display device.

In step 21, the processing module 14 controls the touch screen 21 to display the image 122, which is in a default position, where there is a predetermined minimum distance between boundaries of the image 122 and the display area 121 (see FIG. 5). In this embodiment, the image 122 and the display area 121 are both rectangular, and in the default position, the image 122 is at the center of the display area 121.

In step 22, at the end of an $(X)^{th}$ unit time period, the processing module 14 estimates a displacement distance of the portable display device 1 in a first direction during an $(X+1)^{th}$ unit time period, based on a number (N) of displacement distances of the portable display device 1 in the first direction respectively during (N) number of immediately previous consecutive unit time periods (namely an $(X-N+1)^{th}$ unit time period to the $(X)^{th}$ unit time period) as obtained by the detection module 11, where (X) is a variable and (N) is a positive integer, and represents a sample length.

In this embodiment, the acceleration sensing unit 112 of the detection module 11 senses accelerations of the portable display device 1 in the first direction respectively during the (N) number of immediately previous consecutive unit time periods so as to generate an acceleration signal, and outputs the acceleration signal to the calculating unit 111. The calculating unit 111 calculates the displacement distances $D[x]$, $X-N+1 \le x \le X$ of the portable display device 1 in the first direction respectively during the (N) number of immediately previous consecutive unit time periods based on the acceleration signal. The displacement distances $D[x]$, $X-N+1 \le x \le X$ are calculated according to the following equation (1):

$$D[x] \approx \rho \cdot D[x-1] + \gamma \cdot t^2 \cdot a(\dot{x}) \quad (1)$$

, where $\rho$ and $\gamma$ represent power coefficients, t represents a unit time period, $a(x)$ represents an acceleration of the portable display device 1 corresponding to an $(x)^{th}$ consecutive unit time period (e.g., an average acceleration over the $(x)^{th}$ consecutive unit time period.

However, in other embodiments, the image capturing unit of the detection module 11 may capture sequentially a number (N+1) of images of a feature part of the user 6 or the portable display device 1 (e.g., a nose of the user 6, a corner of the portable display device 1) during the (N) number of immediately previous consecutive unit time periods, and to output the images, which constitute image data, to the image processor. In the case that the image capturing unit of the detection module 11 is an eyewear image capturing device or a headwear image capturing device, the image capturing unit may capture sequentially the number (N+1) of images of the feature part of the portable display device 1 (e.g., the corner of portable display device 1). In the case that the image capturing unit of the detection module 11 is a front panel camera, the image capturing unit may capture sequentially the number (N+1) of images of the feature part of the user 6 (e.g., the nose of the user 6).

It is rioted that a first one of the number (N+1) of images is captured at the beginning of a first one of the (N) number of immediately previous consecutive unit time periods, and an $(N+1)^{th}$ one of the number (N+1) of images is captured at the end of an $(N)^{th}$ one of the (N) number of immediately previous consecutive unit time periods. The image processor processes and analyzes the image data from the image capturing unit to obtain the displacement distances during the (N) number of immediately previous consecutive unit time periods in a known way.

It is noted that the portable display device 1 shakes from the perspective of the user's view is due to the relative motion between a head of the user 6 and a hand of the user 6 that holds the portable display device 1. Therefore, the displacement distances which are obtained based on the image data are more reliable than the displacement distances which are obtained based on the acceleration signal. However, using image data to obtain the displacement distances consumes large amounts of computing resources and time.

In this embodiment, the displacement distance of the portable display device 1 during the $(X+1)^{th}$ unit time period is obtained by the processing module 14 based on the displacement distances of the portable display device 1 respectively during the (N) number of immediately previous consecutive unit time periods and further on an autoregressive model. The autoregressive model is represented by the following equation (2):

$$\hat{D}[X+1] = \sum_{i=1}^{N} \alpha_i \cdot D[X+1-i], \quad (2)$$

where $\hat{D}[X+1]$ represents the displacement distance of the portable display device 1 in the first direction during the $(X+1)^{th}$ unit time period, $\alpha_i$ represents a linear regression coefficient, and $D[X+1-i]$ represents the displacement distance of the portable display device 1 during an $(X+1-i)^{th}$ unit time period.

When N<X, the autoregressive model is represented by the following equation (3):

$$\begin{bmatrix} w_1 & 0 & \cdots & 0 \\ 0 & w_2 & & 0 \\ \vdots & & \ddots & \\ 0 & 0 & & w_{X-N} \end{bmatrix}^{1/2} \begin{bmatrix} D[N+1] \\ \vdots \\ D[N+k] \\ \vdots \\ D[X] \end{bmatrix} = \begin{bmatrix} w_1 & 0 & \cdots & 0 \\ 0 & w_2 & & 0 \\ \vdots & & \ddots & \\ 0 & 0 & & w_{X-N} \end{bmatrix}^{1/2} \quad (3)$$

$$\begin{bmatrix} D[N] & D[N-1] & \cdots & D[1] \\ \vdots & \vdots & & \vdots \\ D[N+k-1] & D[N+k-2] & \cdots & D[k] \\ \vdots & \vdots & & \vdots \\ D[X-1] & D[X-2] & \cdots & D[X-N] \end{bmatrix} \cdot \begin{bmatrix} \alpha_1 \\ \vdots \\ \alpha_k \\ \vdots \\ \alpha_N \end{bmatrix} +$$

$$\begin{bmatrix} w_1 & 0 & \cdots & 0 \\ 0 & w_2 & & 0 \\ \vdots & & \ddots & \\ 0 & 0 & & w_{X-N} \end{bmatrix}^{1/2} \begin{bmatrix} e_1 \\ \vdots \\ e_k \\ \vdots \\ e_{X-N} \end{bmatrix},$$

where $$\begin{bmatrix} w_1 & 0 & \cdots & 0 \\ 0 & w_2 & & 0 \\ \vdots & & \ddots & \\ 0 & 0 & & w_{X-N} \end{bmatrix}$$

represents a weight matrix, $w_j = \lambda \cdot w_{j+1}$, $0 < \lambda \leq 1$ and $w_{X-N} = 1$, and $$\begin{bmatrix} e_1 \\ \vdots \\ e_k \\ \vdots \\ e_{X-N} \end{bmatrix}$$

represents an error matrix.

In this embodiment, $$\begin{bmatrix} \alpha_1 \\ \vdots \\ \alpha_k \\ \vdots \\ \alpha_N \end{bmatrix}$$

is obtained based on a weighted least squares technique. However, in other embodiments, $$\begin{bmatrix} \alpha_1 \\ \vdots \\ \alpha_k \\ \vdots \\ \alpha_N \end{bmatrix}$$

may be obtained based on a recursive weighted least squares technique thereby reducing computing resources and time, but may not be limited to the disclosure herein.

In step 23, at the end of the $(X)^{th}$ unit time period, the processing module 14 determines whether a first time interval between the time at which a latest input signal was received and the beginning of the $(X+1)^{th}$ unit time period (i.e. the end of the $(X)^{th}$ unit time period) is longer than a predetermined threshold time interval. When the processing module 14 determines that the first time interval is longer than the predetermined threshold time interval, the flow proceeds to step 24. Otherwise, the flow goes to step 21.

In step 24, the processing module 14 determines whether at least one of the displacement distances corresponding to the $(X-N+1)^{th}$ to $(X)^{th}$ unit time periods is larger than a predetermined threshold distance. When the processing module 14 determines that at least one of the displacement distances corresponding to the $(X-N+1)^{th}$ to $(X)^{th}$ unit time periods is larger than the predetermined threshold distance, the flow proceeds to step 25. Otherwise, the flow goes to step 26.

In step 25, the processing module 14 determines whether a second time interval between the end of a latest one of at least one of the (N) number of immediately previous consecutive unit time periods corresponding to the at least one of the displacement distances and the beginning of the $(X+1)^{th}$ unit time period is longer than the predetermined threshold time interval. When the processing module 14 determines that the second time interval is longer than the predetermined threshold time interval, the flow proceeds to step 26. Otherwise, the flow goes to step 21.

In step 26, the processing module 14 calculates an offset displacement distance associated with the image 122 based on the displacement distance of the $(X+1)^{th}$ unit time period estimated in step 22 and a predetermined offset parameter. The offset displacement distance is calculated according to the following equation (4):

$$R = c \cdot \hat{D}[X+1] \tag{4}$$

, where R represents the offset displacement distance and c represents the predetermined offset parameter.

In step 27, the processing module 14 controls the portable display device 1 to shift the image 122 by the offset displacement distance with respect to the display area 121 (from a latest position, e.g., the default position) in a second direction opposite to the first direction.

Figure 3:
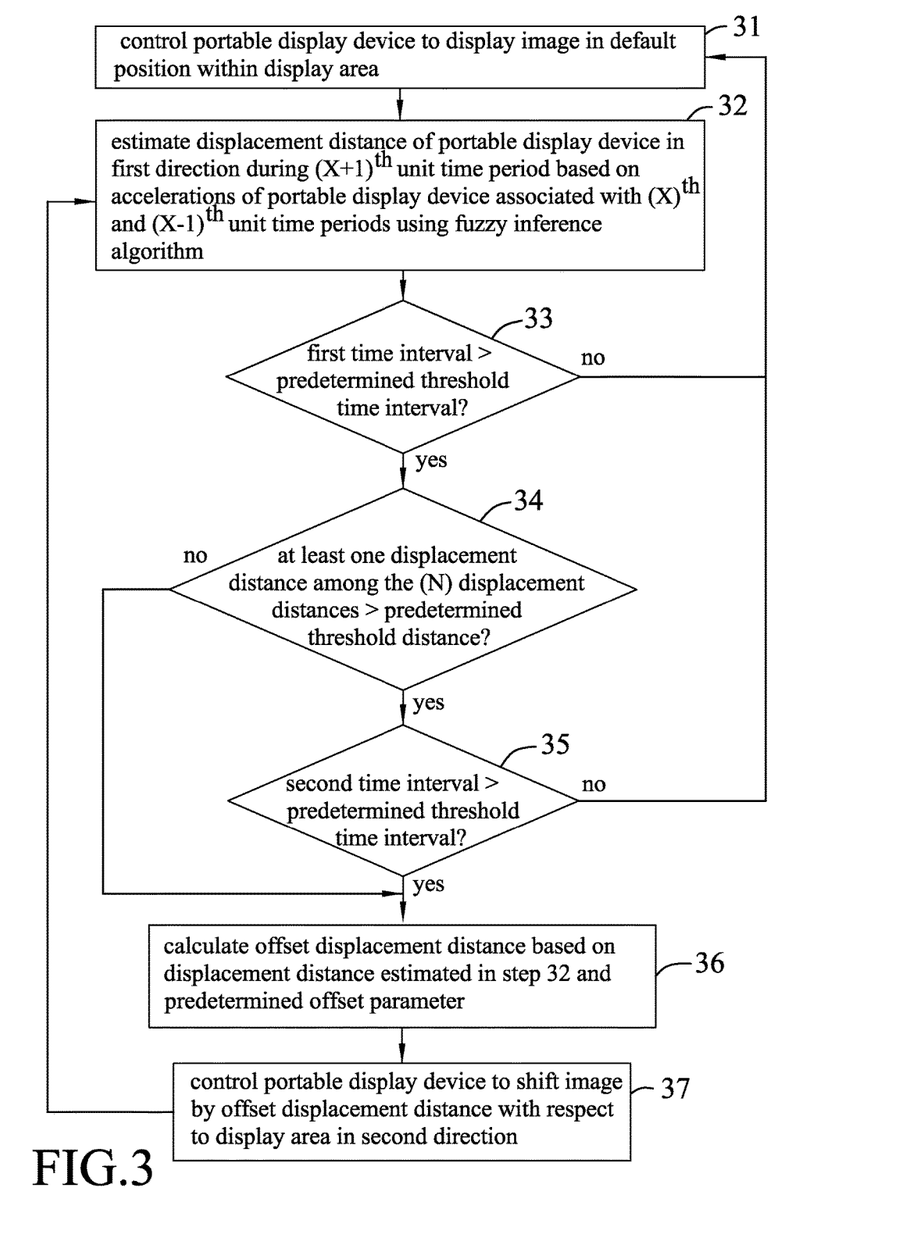
FIG. 3 is a flow chart illustrating the second embodiment of an image display method for a portable display device according to the disclosure.

FIG. 3 is a flow chart illustrating how the processing module 14 implements the second embodiment of an image display method for a portable display device according to the disclosure. The process flow of the second embodiment is a modification of that of the first embodiment of FIG. 2. Steps 31 and 33-37 are similar respectively to steps 21 and 23-27 of the first embodiment (FIG. 2).

In step 32 of the second embodiment, unlike step 22 of the first embodiment (FIG. 2), the processing module 14 estimates, using a conventional fuzzy inference algorithm, the displacement distance of the portable display device 1 in the first direction during the $(X+1)^{th}$ unit time period based on accelerations of the portable display device 1 respectively corresponding to the $(X-1)^{th}$ and $(X)^{th}$ unit time periods (e.g., average accelerations respectively over the $(X-1)^{th}$ and $(X)^{th}$ unit time periods) obtained by the detection module 11.

In this embodiment, the accelerations of the portable display device 1 respectively corresponding to the $(X-1)^{th}$ and $(X)^{th}$ unit time periods serve respectively as two fuzzy input variables in the fuzzy inference algorithm. The displacement distance of the portable display device 1 during the $(X+1)^{th}$ unit time period serves as a fuzzy output variable in the fuzzy inference algorithm. Each of Tables 1 to 3 recites a plurality of fuzzy linguistic values and a plurality of fuzzy numbers corresponding to a respective one of a plurality of preset membership functions for the acceleration of the portable display device 1 corresponding to the $(X-1)^{th}$ unit time period, the acceleration of the portable display device 1 corresponding to the $(X)^{th}$ unit time period and the displacement distance of the portable display device 1 during the $(X+1)^{th}$ unit time period. A predetermined rule base in the fuzzy inference algorithm includes four rules which are recited in Table 4 below. In another embodiment of this disclosure, the number of the rules of the predetermined rule base may be greater than four, the number of the fuzzy linguistic values for each of the preset membership functions may be greater than three, and the fuzzy numbers for each of the preset membership functions may be also adjusted according to different needs. Therefore, the predetermined rule base, the fuzzy linguistic values and the fuzzy numbers should not be limited to the disclosed embodiment herein.

TABLE 1

Preset membership function for the acceleration of the portable display device corresponding to the $(X-1)^{th}$ unit time period

| Fuzzy linguistic value | Fuzzy number |
| --- | --- |
| Negative and Great | (−6, −6, −3, −0.2) |
| Medium | (−1.5, −0.2, 0.2, 1.5) |
| Positive and Great | (0.2, 3, 6, 6) |

TABLE 2

Preset membership function for the acceleration of the portable display device corresponding to the $(X)^{th}$ unit time period

| Fuzzy linguistic value | Fuzzy number |
| --- | --- |
| Negative and Great | (−6, −6, −3, −0.2) |
| Medium | (−1.5, −0.2, 0.2, 1.5) |
| Positive and Great | (0.2, 3, 6, 6) |

TABLE 3

Preset membership function for the displacement distance of the portable display device during the $(X+1)^{th}$ unit time period

| Fuzzy linguistic value | Fuzzy number |
| --- | --- |
| Negative | (−0.28, −0.28, 0, 0) |
| Positive | (0, 0, 0.28, 0.28) |

TABLE 4

| | |
| --- | --- |
| First rule | If the acceleration of the portable display device corresponding to the $(X-1)^{th}$ unit time period is negative and great and the acceleration of the portable display device corresponding to the $(X)^{th}$ unit time period is negative and great, then the displacement distance of the portable display device during the $(X+1)^{th}$ unit time period is negative |
| Second rule | If the acceleration of the portable display device corresponding to the $(X-1)^{th}$ unit time period is negative and great and the acceleration of the portable display device corresponding to the $(X)^{th}$ unit time period is medium, then the displacement distance of the portable display device during the $(X+1)^{th}$ unit time period is negative |
| Third rule | If the acceleration of the portable display device corresponding to the $(X-1)^{th}$ unit time period is positive and great and the acceleration of the portable display device corresponding to the $(X)^{th}$ unit time period is medium, then the displacement distance of the portable display device during the $(X+1)^{th}$ unit time period is positive |
| Fourth rule | If the acceleration of the portable display device corresponding to the $(X-1)^{th}$ unit time period is positive and great and the acceleration of the portable display device corresponding to the $(X)^{th}$ unit time period is positive and great, then the displacement distance of the portable display device during the $(X+1)^{th}$ unit time period is positive |

The following are some of the advantages attributed to using the fuzzy inference algorithm to estimate the displacement distance of the portable display device 1 in the first direction during the $(X+1)^{th}$ unit time period:

1. The inference procedure in the fuzzy inference algorithm is easy to modify.

2. Since the fuzzy input variables for inference may have fuzzinesses, the inference procedure is tolerant to imprecise and uncertain data.

3. Since the mathematical concepts behind fuzzy reasoning are very simple, computing resources and time for inference can be reduced.

Figure 4:
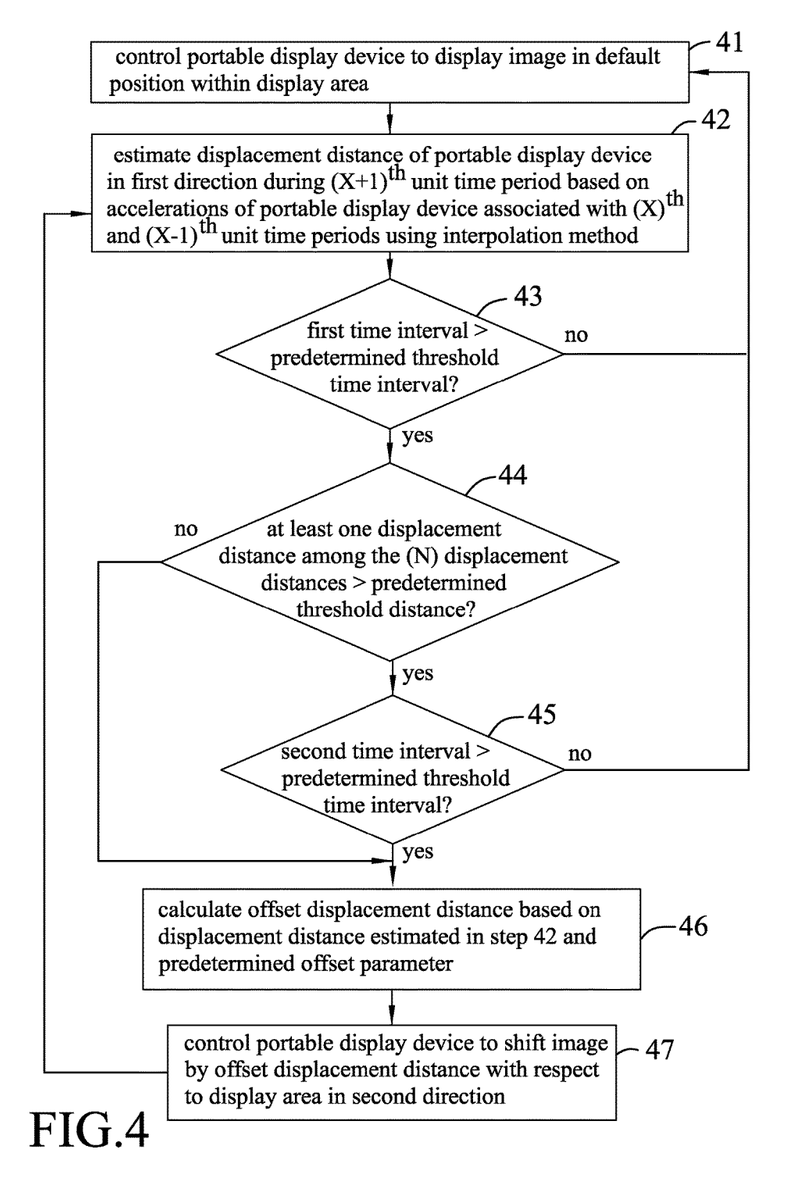
FIG. 4 is a flow chart illustrating the third embodiment of an image display method for a portable display device according to the disclosure.

FIG. 4 is a flow chart illustrating how the processing module 14 implements the third embodiment of an image display method for a portable display device according to the disclosure. The process flow of the third embodiment is a modification of that of the first embodiment of FIG. 2. Steps 41 and 43-47 are similar respectively to steps 21 and 23-27 of the first embodiment (FIG. 2).

In step 42 of the third embodiment, unlike step 22 of the first embodiment (FIG. 2), the processing module 14 estimates, using an interpolation method such as a 2D bilinear interpolation, the displacement distance of the portable display device 1 in the first direction during the $(X+1)^{th}$ unit time period based on the accelerations of the portable display device 1 respectively corresponding to the $(X-1)^{th}$ and $(X)^{th}$ unit time periods obtained by the detection module 11 (e.g., average accelerations over the $(X-1)^{th}$ and $(X)^{th}$ unit time periods), and further on the lookup table that is stored in the storing module 13 and that contains a list of displacement distances corresponding respectively to a list of sets of accelerations. Each set of accelerations contains two accelerations that correspond respectively to two consecutive unit time periods. The estimated displacement distance for the $(X+1)^{th}$ unit time period is obtained by searching the lookup table for one displacement distance in the list of displacement distances that corresponds to one of the sets of accelerations, whose two accelerations respectively correspond to the accelerations over the $(X-1)^{th}$ and $(X)^{th}$ unit time periods as obtained by the detection module 11.

The advantage of using the lookup table to estimate the displacement distance of the portable display device 1 in the first direction during the $(X+1)^{th}$ unit time period is that it requires less computing resources and time. It is noted that the list of displacement distances and the list of sets of accelerations in the lookup table can be predefined or obtained in advance through fuzzy inference, machine learning, or statistical analysis of experiments.

To sum up, by virtue of the processing module 14 which estimates the displacement distance of the portable display device 1 in the first direction during an $(X+1)^{th}$ unit time period, and calculates the offset displacement distance based on the displacement distance estimated thereby and the predetermined offset parameter, the offset displacement distance determined may be more accurate. In addition, when the first time interval is shorter than or equal to the predetermined threshold time interval, the image 122 is controlled to be in the default position (i.e., at the center of the display area 121 in this embodiment), thereby facilitating further touch operation by the user 6. When the second time interval is shorter than or equal to the predetermined threshold time interval, the image 122 is also controlled to be in the default position, thereby ensuring that the image 122 is in the default position when the portable display device 1 experiences abrupt but great movements. It is noted that when the portable display device 1 continuously moves in a first direction while the first and second time intervals are both longer than the predetermined threshold time interval, the processing module 14 would continuously control the portable display device 1 to shift the image 122 with respect to the display area 121 in the second direction such that only a partial image 122 may be visible (with a portion of the image 122 shifted out of the display area 121 (see FIG. 6)). Under such case, once the processing module 14 receives an input signal from the touch screen 12 or determines that a current displacement distance of the portable display device 1 as sensed by the detecting module 11 is larger than the predetermined threshold distance, the processing module 14 controls the portable display device 1 to shift the image 122 back to the default position.

In the description above, for the purposes of explanation, numerous specific details have been set forth in order to provide a thorough understanding of the embodiment (s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An image display method for a portable display device to be implemented by a processing module, the portable display device including a detection module, said image display method comprising the steps of:
   (A) controlling the portable display device to display an image in a default position within a display area of the portable display device, there being a predetermined minimum distance between boundaries of the image and the display area when the image is in the default position;
   (B) estimating a displacement distance of the portable display device in a first direction during an $(X+1)^{th}$ unit time period, based at least on a number (N) of displacement distances of the portable display device in the first direction respectively during (N) number of immediately previous consecutive unit time periods as obtained by the detection module or on accelerations of the portable display device respectively associated with $(X-1)^{th}$ and $(X)^{th}$ unit time periods as obtained by the detection module, where (X) is a variable and (N) is a positive integer;
   (C) calculating, based on the displacement distance estimated in step (B) and a predetermined offset parameter, an offset displacement distance associated with the image; and
   (D) controlling the portable display device to shift the image by the offset displacement distance with respect to the display area in a second direction opposite to the first direction;
   wherein, in step (B), the displacement distance of the portable display device in the first direction during the $(X+1)^{th}$ unit time period is obtained by the processing module based on the displacement distances of the portable display device in the first direction respectively during the (N) number of immediately previous consecutive unit time periods and on an autoregressive model;
   wherein the autoregressive model is represented as $$\hat{D}[X+1] = \sum_{i=1}^{N} \alpha_i \cdot D[X+1-i],$$

where $\hat{D}[X+1]$ represents the displacement distance of the portable display device in the first direction during the $(X+1)^{th}$ unit time period, $\alpha_i$ represents a linear regression coefficient, and $D[X+1-i]$ represents the displacement distance of the portable display device during an $(X+1-i)^{th}$ unit time period;
   wherein, when N<X, the autoregressive model is represented as $$\begin{bmatrix} w_1 & 0 & \cdots & 0 \\ 0 & w_2 & & 0 \\ \vdots & & \ddots & \\ 0 & 0 & & w_{X-N} \end{bmatrix}^{1/2} \begin{bmatrix} D[N+1] \\ \vdots \\ D[N+k] \\ \vdots \\ D[X] \end{bmatrix} = \begin{bmatrix} w_1 & 0 & \cdots & 0 \\ 0 & w_2 & & 0 \\ \vdots & & \ddots & \\ 0 & 0 & & w_{X-N} \end{bmatrix}^{1/2}$$

$$\begin{bmatrix} D[N] & D[N-1] & \cdots & D[1] \\ \vdots & \vdots & & \vdots \\ D[N+k-1] & D[N+k-2] & \cdots & D[k] \\ \vdots & \vdots & & \vdots \\ D[X-1] & D[X-2] & \cdots & D[X-N] \end{bmatrix} \cdot \begin{bmatrix} \alpha_1 \\ \vdots \\ \alpha_k \\ \vdots \\ \alpha_N \end{bmatrix} +$$

$$\begin{bmatrix} w_1 & 0 & \cdots & 0 \\ 0 & w_2 & & 0 \\ \vdots & & \ddots & \\ 0 & 0 & & w_{X-N} \end{bmatrix}^{1/2} \begin{bmatrix} e_1 \\ \vdots \\ e_k \\ \vdots \\ e_{X-N} \end{bmatrix},$$

where $$\begin{bmatrix} w_1 & 0 & \cdots & 0 \\ 0 & w_2 & & 0 \\ \vdots & & \ddots & \\ 0 & 0 & & w_{X-N} \end{bmatrix}$$

represents a weight matrix, $w_j = \lambda \cdot w_{j+1}, 0 < \lambda \leq 1$ and $w_{X-N} = 1$, and $$\begin{bmatrix} e_1 \\ \vdots \\ e_k \\ \vdots \\ e_{X-N} \end{bmatrix}$$

represents an error matrix.

2. The image display method as claimed in claim 1, the portable display device further including a touch screen having the display area and connected electrically to the processing module for outputting thereto an input signal generated in response to a touch operation, said image display method further comprising, between steps (B) and (C), the step of (E) at the end of the $(X)^{th}$ unit time period, determining whether a time interval between the time at which a latest input signal was received and the beginning of the $(X+1)^{th}$ unit time period is longer than a predetermined threshold time interval, wherein step (C) is performed when it is determined in step (E) that the time interval is longer than the predetermined threshold time interval.

3. The image display method as claimed in claim 1, further comprising, between steps (B) and (C), the step of (F) determining whether at least one of the displacement distances corresponding to the (N) number of immediately previous consecutive unit time periods is larger than a predetermined threshold distance;

(G) when it is determined in step (F) that at least one of the displacement distances is larger than the predetermined threshold distance, determining whether a time interval between the end of a latest one of at least one of the (N) number of immediately previous consecutive unit time periods corresponding to the at least one of the displacement distances and the beginning of the $(X+1)^{th}$ unit time period is longer than a predetermined threshold time interval, wherein step (C) is performed when it is determined in step (G) that the time interval is longer than the predetermined threshold time interval.

4. The image display method as claimed in claim 1, wherein, in step (B), the displacement distance of the portable display device in the first direction during the $(X+1)^{th}$ unit time period is estimated by the processing module based on the accelerations of the portable display device respectively associated with the $(X-1)^{th}$ and $(X)^{th}$ unit time periods using a fuzzy inference algorithm.

5. The image display method as claimed in claim 1, wherein, in step (B), the displacement distance of the portable display device in the first direction during the $(X+1)^{th}$ unit time period is estimated by the processing module based on the accelerations of the portable display device respectively associated with the $(X-1)^{th}$ and $(X)^{th}$ unit time periods and further on a lookup table that contains a list of different displacement distances corresponding respectively to a list of different sets of two accelerations using an interpolation method.

6. The image display method as claimed in claim 1, wherein $$\begin{bmatrix} \alpha_1 \\ \vdots \\ \alpha_k \\ \vdots \\ \alpha_N \end{bmatrix}$$

is obtained based on a weighted least squares technique.

7. The image display method as claimed in claim 1, wherein, in step (C), the offset displacement distance is equal to the product of the predetermined offset parameter and the displacement distance estimated in step (B).

8. The image display method as claimed in claim 1, the displacement detection module including an image capturing unit, wherein, in step (B), the displacement distances of the portable display device during the (N) number of immediately previous consecutive unit time periods are obtained based on image data which includes a number (N+1) of images of a feature part of the portable display device or a user thereof sequentially captured by the image capturing unit during the (N) number of immediately previous consecutive unit time periods.

* * * * *